(12) United States Patent
Hanson (10) Patent No.: US 9,144,927 B2
(45) Date of Patent: Sep. 29, 2015

(54) METHOD OF ROTATING MOLD OR OTHER ARTICLES

(75) Inventor: Lyle R. Hanson, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 53 days.

(21) Appl. No.: 13/555,554

(22) Filed: Jul. 23, 2012

(65) Prior Publication Data

US 2012/0292798 A1 Nov. 22, 2012

Related U.S. Application Data

(63) Continuation of application No. 11/964,997, filed on Dec. 27, 2007, now Pat. No. 8,246,341.

(51) Int. Cl.
| | |
|---|---|
| *B29C 33/30* | (2006.01) |
| *B29C 45/17* | (2006.01) |
| *B29C 31/00* | (2006.01) |
| *B28B 5/12* | (2006.01) |
| *B28B 5/08* | (2006.01) |

(Continued)

(52) U.S. Cl.
CPC ............ *B29C 45/1756* (2013.01); *B29C 31/006* (2013.01); *B28B 5/06* (2013.01); *B28B 5/08* (2013.01); *B28B 5/10* (2013.01); *B28B 5/12* (2013.01); *B29C 33/30* (2013.01); *B29C 33/303* (2013.01); *B29C 33/305* (2013.01); *B29C 33/306* (2013.01); *B29C 33/307* (2013.01); *B29C 33/70* (2013.01); *B29C 33/72* (2013.01); *B29C 45/40* (2013.01); *B29D 30/0603* (2013.01)

(58) Field of Classification Search
CPC .. B29C 31/006; B29C 45/1756; B29C 33/70; B29C 33/305; B29C 33/307; B29C 33/30; B29C 33/303; B29C 33/306; B29C 33/72; B29C 45/40; B29D 30/0603; B28B 5/06; B28B 5/08; B28B 5/10; B28B 5/12
USPC ......... 425/117, 186, 188, 189, 195, 214, 453, 425/454; 297/183.2, 183.3, 188.6, 256.13, 297/258.1, 270.2, 271.6, 377, 131; 264/39, 264/310, 334, 336
See application file for complete search history.

(56) References Cited

U.S. PATENT DOCUMENTS

| | | | | |
|---|---|---|---|---|
| 1,491,846 | A | * | 4/1924 | Coates ........................ 164/133 |
| 2,034,164 | A | * | 3/1936 | Van Kamerik ................. 425/98 |

(Continued)

OTHER PUBLICATIONS

Website, including video link, located at http://www.k-cut.com/moldtipper.htm (last visited Apr. 15, 2008).

(Continued)

*Primary Examiner* — Seyed Masoud Malekzadeh
(74) *Attorney, Agent, or Firm* — Banner & Witcoff, Ltd.

(57) ABSTRACT

A mold rotator with a first section and a second section that are engaged approximately perpendicularly to each other to produce a base and an L-shaped platform for receiving the article. The base of the article rotator may have a curved section at the intersection of the first section and the second section and the article rotator may rotate on its curved section between a first position wherein the article rotator is supported on its first section and a second position wherein the article rotator is supported on its second section. Further, the article rotator allows an article to be safely rotated simply by lowering the article onto the article rotator so that the article rotator automatically rotates approximately 90° from a first position and a second, rotated position. The article rotator may include a stabilizing system.

23 Claims, 4 Drawing Sheets

(51) Int. Cl.

| | |
|---|---|
| *B28B 5/06* | (2006.01) |
| *B28B 5/10* | (2006.01) |
| *B29C 45/40* | (2006.01) |
| *B29C 33/72* | (2006.01) |
| *B29D 30/06* | (2006.01) |
| *B29C 33/70* | (2006.01) |

(56) References Cited

U.S. PATENT DOCUMENTS

| | | | |
|---|---|---|---|
| 2,432,450 A | 7/1945 | Sears | |
| 2,466,277 A * | 4/1949 | Rubissow | 164/114 |
| 2,812,543 A | 11/1957 | Stacy | |
| 3,080,636 A * | 3/1963 | Zerlaut | 425/439 |
| 3,257,484 A * | 6/1966 | Barnette | 264/46.2 |
| 3,526,429 A | 9/1970 | Metzger | |
| 3,647,345 A * | 3/1972 | Claessens et al. | 425/439 |
| 3,674,408 A | 7/1972 | Baumgartner et al. | |
| 3,720,492 A | 3/1973 | Hehl | |
| 3,771,928 A * | 11/1973 | Gostyn et al. | 425/4 R |
| 3,804,459 A | 4/1974 | Nose | |
| 3,816,044 A | 6/1974 | Nielsen et al. | |
| 3,840,317 A | 10/1974 | Koch et al. | |
| 3,909,179 A * | 9/1975 | Chujoo et al. | 425/429 |
| 3,981,671 A | 9/1976 | Edwards | |
| 3,982,874 A | 9/1976 | Nobbe | 425/424 |
| 4,080,129 A * | 3/1978 | Little | 425/85 |
| RE30,130 E | 10/1979 | Edwards | |
| 4,181,485 A | 1/1980 | Schramm | |
| 4,191,523 A * | 3/1980 | Niederst et al. | 425/589 |
| 4,212,614 A | 7/1980 | Holzinger | |
| 4,337,026 A | 6/1982 | Taubenmann et al. | |
| 4,367,870 A | 1/1983 | Birch | |
| 4,409,917 A | 10/1983 | Kramer Da Luz | |
| 4,431,397 A * | 2/1984 | Fried et al. | 425/384 |
| 4,472,130 A * | 9/1984 | Demonsablon et al. | 425/436 RM |
| 4,637,540 A | 1/1987 | Fujita et al. | |
| 4,676,938 A | 6/1987 | Karklin et al. | |
| 4,688,850 A | 8/1987 | Brownlie et al. | |
| 4,708,611 A * | 11/1987 | Bouteiller | 425/62 |
| 4,735,562 A * | 4/1988 | Boutellier | 425/62 |
| 4,841,364 A | 6/1989 | Kosaka et al. | |
| 4,880,792 A * | 11/1989 | Yoshioka et al. | 425/190 |
| 4,919,481 A | 4/1990 | Garabedian | |
| 4,952,131 A * | 8/1990 | Shirai et al. | 425/190 |
| 4,993,933 A * | 2/1991 | Yoshioka et al. | 425/190 |
| 5,011,221 A | 4/1991 | Wise | |
| 5,033,955 A | 7/1991 | Faig et al. | |
| 5,046,912 A | 9/1991 | Bostrom et al. | |
| 5,090,769 A | 2/1992 | Wade | |
| 5,188,845 A | 2/1993 | Payne | |
| 5,282,732 A | 2/1994 | Eggert | |
| 5,354,196 A | 10/1994 | Ziv-Av | |
| 5,395,232 A * | 3/1995 | Hori | 425/576 |
| 5,554,394 A * | 9/1996 | Feal et al. | 425/434 |
| 5,578,329 A | 11/1996 | Hehl | |
| 5,700,502 A | 12/1997 | Hehl | |
| 5,803,829 A | 9/1998 | Hayashi | |
| 5,811,141 A | 9/1998 | Pickel et al. | |
| 5,919,494 A | 7/1999 | Swenson | |
| 6,068,464 A * | 5/2000 | Su et al. | 425/190 |
| 6,082,987 A * | 7/2000 | Su et al. | 425/150 |
| 6,099,763 A * | 8/2000 | Su et al. | 264/2.2 |
| 6,156,249 A | 12/2000 | Swenson | |
| 6,877,972 B2 * | 4/2005 | Lilienthal et al. | 425/73 |
| 7,017,991 B1 | 3/2006 | Zin | |
| 7,857,707 B2 | 12/2010 | Beppu | |
| 2003/0087046 A1 | 5/2003 | Carpenter | |
| 2005/0110197 A1 | 5/2005 | Deffense | |

OTHER PUBLICATIONS

Pascal Corp. Pamphlet OT-009E Rev. 2, Pascal Mold-Rotator, Model SMF, May 2003.
Materials downloaded on Jul. 23, 2012, from Internet Archive (http://wayback.archive.org/web/*/http://www.k-cut.com/moldtipper.htm) and indicated on Internet Archive as the results from an Oct. 31, 2006, crawl of "http://www.k-cut.com/moldtipper.htm".

* cited by examiner

METHOD OF ROTATING MOLD OR OTHER ARTICLES

CROSS-REFERENCE TO RELATED APPLICATIONS

This application is a continuation of U.S. patent application Ser. No. 11/964,997, filed Dec. 27, 2007, now U.S. Pat. No. 8,246,341, and titled "Mold Rotator," which application, in its entirety, is incorporated by reference herein

FIELD OF THE INVENTION

Aspects of the present invention relate generally to systems and methods for handling and rotating articles, such as molds. In more specific examples, aspects of the invention relate to systems and methods for stabilizing article rotators.

BACKGROUND

A mold is tooling that is used to produce parts in a molding process such as injection molding, die casting or other similar technologies. For example, in an injection molding process, a mold may include at least two sections that when engaged together form the mold. While plastic injection molds can have at least two movable sections, alternatively they may be comprised of several movable sections. The interior of the mold has one or more cavities. The cavities have a particular design that is the inverse of the part or parts to be manufactured. In the injection molding process, molten plastic is inserted into the cavities and the part or parts are formed in the cavities upon solidification of the plastic. When the formation of the part or parts is complete, the mold is opened to remove the part or parts.

Molds can vary greatly in size and weight depending on several factors. One such factor is the material from which the mold is created. For example, conventional molds may be constructed from steel, aluminum or other materials. Further, the size and weight of the mold will depend on the part or parts that will be manufactured in the molds. For example, molds can be used to produce small plastic components or extremely large items such as boat hulls. For larger items, the size and weight of the mold can range up to 60 tons or more.

At times it may be necessary to rotate a mold for inspection, disassembly, cleaning, repair, etc. Due to the size and weight of a mold, mold rotators (also called "mold tippers") may be used to rotate the molds. One advantage of rotating the mold is that the rotated orientation of mold may be much more conducive for disassembly of the mold or removal of the mold from the mold rotator. For example, if a mold is comprised of several sections, the orientation of the mold in the rotated position may allow for the mold sections to be separated much more safely and easily than when the mold is the non-rotated orientation.

Some conventional mold rotators may include hydraulic systems and/or motorized systems to rotate a mold. These conventional mold rotators may include gear systems, roller guides, etc. Such mold rotators are expensive, complicated and cumbersome.

Other conventional mold rotators may not have such complicated systems, however, these simpler conventional mold rotators suffer from the drawback that once the mold rotator has been rotated, the mold cannot be easily and safely removed from the mold rotator. In other words, in such a mold rotator, if the mold is inserted into the mold rotator and then rotated from that first position to a second, rotated position, then the mold cannot be easily and safely removed from the mold rotator, because the mold rotator will self-rotate back to the first position upon removal of the mold. Further, the mold cannot be disassembled while in the more conducive rotated position, because if the weight of the partially disassembled mold becomes too light, the mold rotator will self-rotate back to the first position. This inadvertent rotation of the mold rotator from the rotated position back to the first position can be dangerous to the operator of the mold rotator and also hazardous for both the mold rotator and the mold itself. These simple conventional mold rotators lack a stabilizing system to hold the mold rotator stationary in a rotated position so that the mold can be disassembled or removed from the mold rotator while the mold is in the rotated position which is more conducive to removal or disassembly.

Accordingly, it would be advantageous to provide an inexpensive and simple mold rotator that will allow a mold to be safely rotated and stabilized in either of a first position or a second, rotated position.

SUMMARY

Aspects of the present invention relate to systems and methods for rotating an article, such as a mold. Additionally, aspects of the invention relate to systems and methods for stabilizing article rotators. At least some aspects of this invention are directed specifically to systems and methods for rotating a mold and stabilizing a mold rotator.

Systems according to aspects of the invention may include an article rotator with a first section and a second section that are engaged approximately perpendicularly to each other to produce a base and an L-shaped platform for receiving the article. In at least some examples, the article rotators are integrally formed L-shaped article rotators. The base of the article rotator may have a curved section at the intersection of the first section and the second section that exhibits a concave towards the L-shaped platform. Further, the article rotator may rotate on its curved section between a first position wherein the article rotator is supported on its first section and a second position wherein the article rotator is supported on its second section.

Additional aspects of the invention relate to an article rotator that allows an article to be safely rotated simply by lowering the article onto the article rotator. Upon insertion of the article into the platform of the article rotator, the article rotator automatically rotates approximately 90° from a first position and a second, rotated position.

Additional aspects of the invention relate to an article rotator wherein the center of gravity of the combined weight of the article rotator and the article lies within the curved section of the article rotator. According to at least some aspects of this invention, the center of gravity of the article rotator may change upon rotation of the article rotator in order to stabilize the article rotator in a particular position.

Additional and more specific aspects of at least some examples of this invention relate to systems for stabilizing an article rotator wherein that the article rotator can be stabilized at both a first position and second position which is approximately 90° from the first position. Further aspects of the invention relate to a stabilizing system with one or more conduits for transferring a material between the first and second sections of the article rotator so that material will stabilize the article rotator at the section in which the material is positioned to prevent the article rotator from inadvertently rotating. Other aspects of the invention relate to the material of the stabilizing system being transferred by gravity. Yet other aspects of the invention relate to the material of the stabilizing system being a fluid.

Additional aspects of the invention relate to an article rotator that may have a periphery that includes a first L-shaped leg and a second L-shaped leg. The L-shaped legs may be spaced across the article rotator in order to the provide support for the article being rotated. In some aspects of this invention, the periphery including the L-shaped legs may be hollow and sealed and act as conduits to transfer material of a stabilizing system between first and second sections of the L-shaped mold rotator. According to some aspects of such article rotators, the material (e.g. a fluid) may fill approximately half, or more of the periphery including half or more of the L-shaped legs.

Still other aspects of the invention relate to methods for rotating a mold. Example methods according to aspects of the invention may include: (a) placing a mold in an L-shaped platform; (b) rotating the L-shaped mold along a curved bottom edge of a base of the L-shaped platform; and (c) stabilizing the L-shaped platform by transferring a fluid between a first section of the L-shaped platform and second section of the L-shaped platform which is approximately perpendicular to the first section.

BRIEF DESCRIPTION OF THE DRAWINGS

The above and other objects, features, and advantages of the present invention will be more readily apparent and more fully understood from the following detailed description, taken in connection with the appended drawings, in which.

DETAILED DESCRIPTION

Various specific examples of the invention are described in detail below in conjunction with the attached figures. The various figures illustrate examples of article rotators useful in systems and methods according to examples of this invention. When the same reference number appears in more than one drawing, that reference number is used consistently in this specification and the drawings to refer to the same part throughout. The reader should understand that these specific examples are set forth merely to illustrate examples of the invention, and they should not be construed as limiting the invention.

Systems according to aspects of this invention may include a simple and inexpensive mold rotator for safely and effectively rotating a heavy steel mold, such as an injection mold, approximately 90°.

According to at least some aspects of this invention, the mold rotator may include two sections that are engaged perpendicularly so that the mold rotator is L-shaped. For example, as seen in the illustrative embodiment shown in FIGS. 1-3, a rotator 100 for an article, such as a mold 200, includes a first section 102 and a second section 104. According to some aspects of the invention, the rotator may be integrally formed so that it is a single unit. As seen in FIG. 2, the first and second sections form an L-shaped platform 106. Therefore, the L-shaped article rotator 100 can receive a mold such that the mold fits into the L-shaped platform 106. The L-shape of the mold rotator 100 allows it to support a mold on two of the mold's sides.

The size of the rotator 100, including the first and second sections 102, 104, depends on the size of the article or mold to be rotated. In other words, a particular mold rotator is designed and sized for a specific range of mold sizes. In some embodiments, the sections may have varying sizes relative to each other (i.e. one section may be longer, larger, wider, etc. than the other section). For example, in the depicted embodiment shown in FIGS. 1 and 3, first section 102 is larger than second section 104. By varying the size, shape, dimensions, etc. of the sections 102 and 104, the center of gravity of the mold rotator 100 may be altered.

According to some aspects of the invention, the mold rotator may also include a base and a curved section of the base which allows the mold rotator to rotate along its base between a first side of the rotator and a second side of the rotator. For example, as seen in the illustrative embodiment of FIG. 2, the first sections 102 and 104 form a base 112 that has a curved section 114 between the first section 102 and the second section 104. The curved section 114 at the base 112 of the rotator 100 allows the rotator 100 to rotate along its base 112 approximately 90° between the first section 102 and the second section 104.

Figure 1:
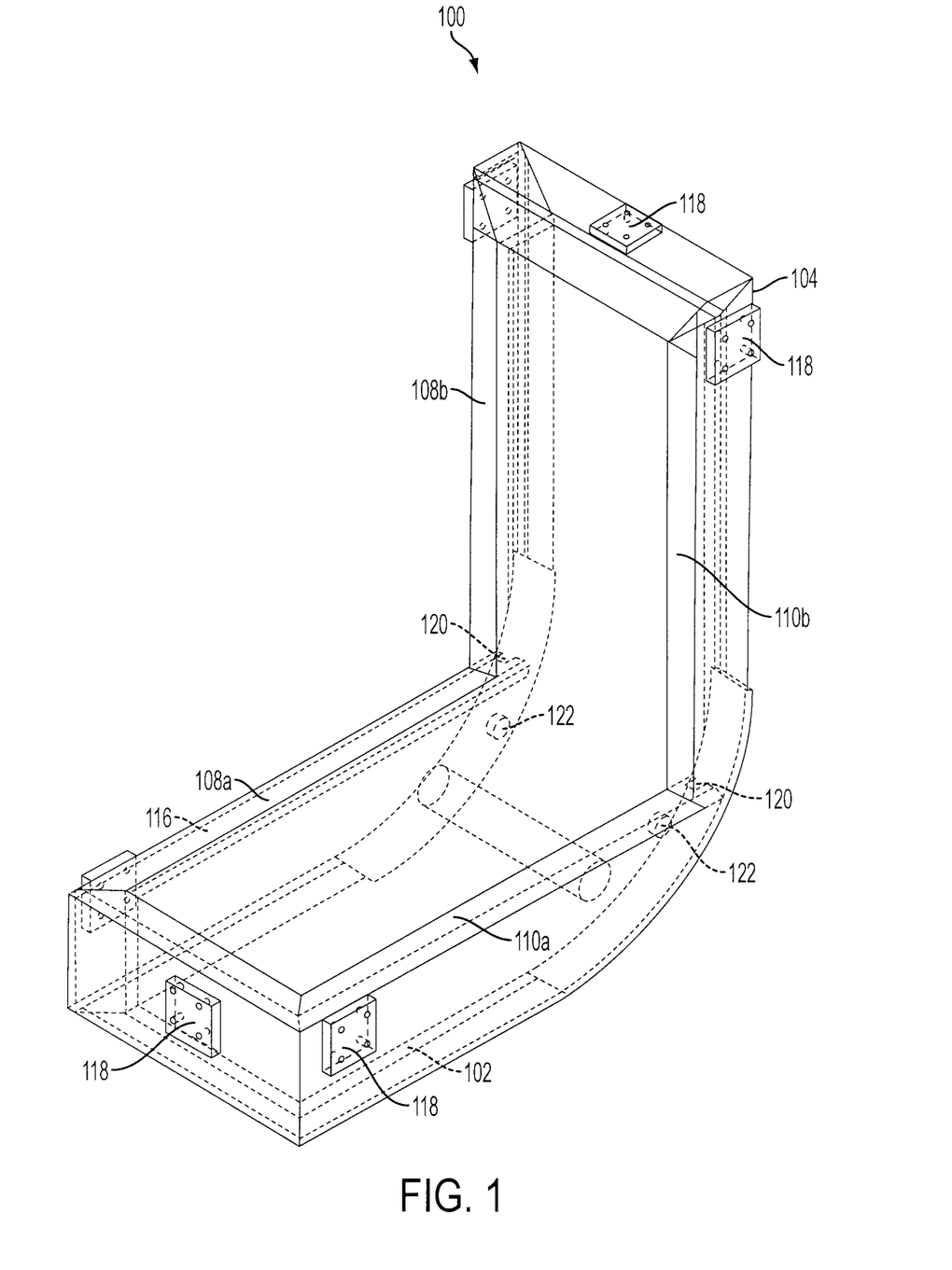
FIG. 1 illustrates a perspective view of a mold rotator according to at least some aspects of this invention.
Figure 2:
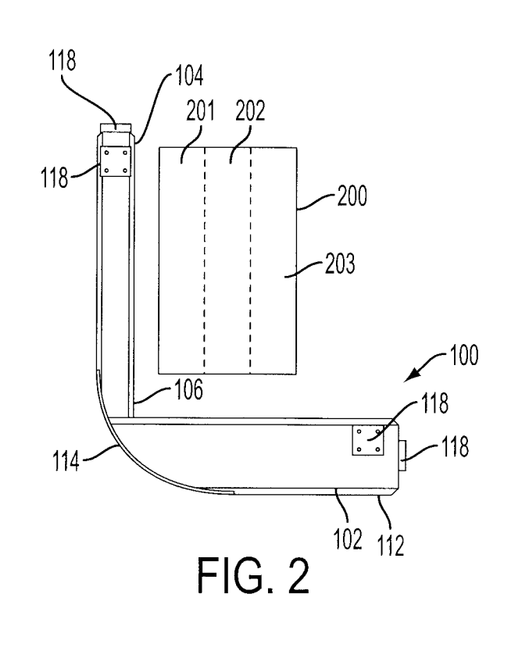
FIG. 2 illustrates a side view of the mold rotator of FIG. 1.
Figure 3:
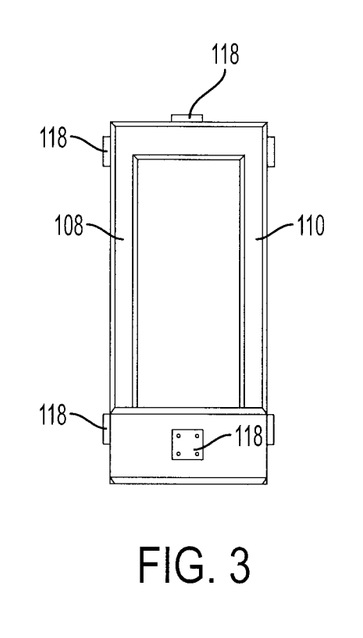
FIG. 3 illustrates a front view of the mold rotator of FIG. 1.

Also, as can be seen in the illustrative embodiment the rotator 100 shown in FIGS. 1-3, the rotator 100 includes a stabilizing system 116 that extends around the mold rotator 100. In this illustrative embodiment, the stabilizing system 116 includes a pair of L-shaped legs 108 and 110. Each of the L-shaped legs 108, 110 include a first section portion 108a, 110a and a second section portion 108b, 110b and thereby the L-shaped legs 108, 110 extend between the first section 102 and the second section 104. As shown in FIGS. 1 and 3, the legs 108 and 110 are separated from each other across the width of the rotator 100 in order to provide stability. Further, as seen in FIGS. 1 and 3, the L-shaped legs 108 and 110 may be connected at their ends in order to form the stabilizing system 116 that extends along the periphery of the mold rotator 100 so as to surround the mold rotator 100. The L-shaped legs 108, 110 provide strength to the mold rotator 100 so that the mold rotator 100 can support the mold 200. As will be described in detail below, according to some aspects of this invention, the stabilizing system 116, including the L-shaped legs 108, 110 may be tubular to allow the material of the stabilizing system to be transferred between the first and second sections 102, 104, of the L-shaped mold rotator 100. Further, as will be described in detail below, in some aspects of the invention, the tubular stabilizing system 116, including the L-shaped legs 108, 110, is constructed so that the internal volume is sealed and, therefore, fluid may be used as the material in the stabilizing system. In a preferred embodiment of the invention the L-shaped legs 108, 110 are internal in the mold rotator 100, but L-shaped legs 108, 110 may be formed or attached to the exterior sides of the rotator 100 as long as the same functions of rotating and stabilizing, etc. are sufficiently realized. In fact, as long as the same functions of rotating and stabilizing, etc. are sufficiently realized the stabilizing system 116 may be placed in any position practical, and take any form desirable, e.g. instead of the stabilizing system 116 extending around the periphery of the mold rotator 100 as shown in FIG. 1, the stabilizing system 116 may extend through the center of the mold rotator 100 or alternatively include a combination of internal conduits and external L-shaped legs, etc. The rotator 100 and many of its components may be constructed from steel, aluminum and/or other materials, including conventional materials well known to those skilled in the art.

Another aspect of the invention relates to securing means for securing the mold 200 to the mold rotator 100. As described above, the L-shaped platform 106 may include securing means for securing the mold 200 to the L-shaped platform 106. For example, in one embodiment, rubber strips may be used to provide friction between the mold 200 and the article rotator 100. The rubber strips may comprise a border around the L-shaped platform 106 which contacts the mold 200 once the mold 200 has been placed in the mold rotator 100. Therefore, the rubber strips aid in preventing the mold 200 from slipping. The rubber strips would also provide protection to the outer surfaces of the rotator and mold. Other securing means, for example, magnetic, mechanical (bolts, screws, etc.) suction, etc. may be used according to aspects of this invention.

The mold rotator may also include elements for providing structural stability. For example, in addition to L-shaped legs 108 and 110 which provide stability, the mold rotator may also include strengthening elements, such as the pipe shown in FIG. 1 which connects the two L-shaped legs. The pipe or other strengthening elements may be provided, although their inclusion is not necessarily required.

A primary function of the article rotator 100 is to rotate the mold 200, 90° between first position and section, rotated position. Therefore, additional aspects of the invention relate to an article rotator sized according to the specific range of the size a mold, including correct proportions of first and section sections, etc., so that the center of gravity of the combined weight of the article rotator and the article lies within the curved section of the article rotator. In the illustrative embodiment shown in FIGS. 1-3, the size and proportions of the mold rotator 100, including the size and dimensions of the first and second sections 102, 104, allow the center of gravity of the combined weight of the mold 200 and the mold rotator 100 to lie within the curve of the curved section 114. By positioning the center of gravity of the combination of the mold 200 and the mold rotator 100 to lie within that curved section 114, the mold rotator 100 allows a mold 200 to be rotated simply by placing the mold 200 onto the mold rotator 100. In other words, as a mold 200 is lowered onto the mold rotator 100, the mold rotator 100 will automatically rotate approximately 90° from a first position and a second, rotated position.

Figures 4A, 4B, 4C:
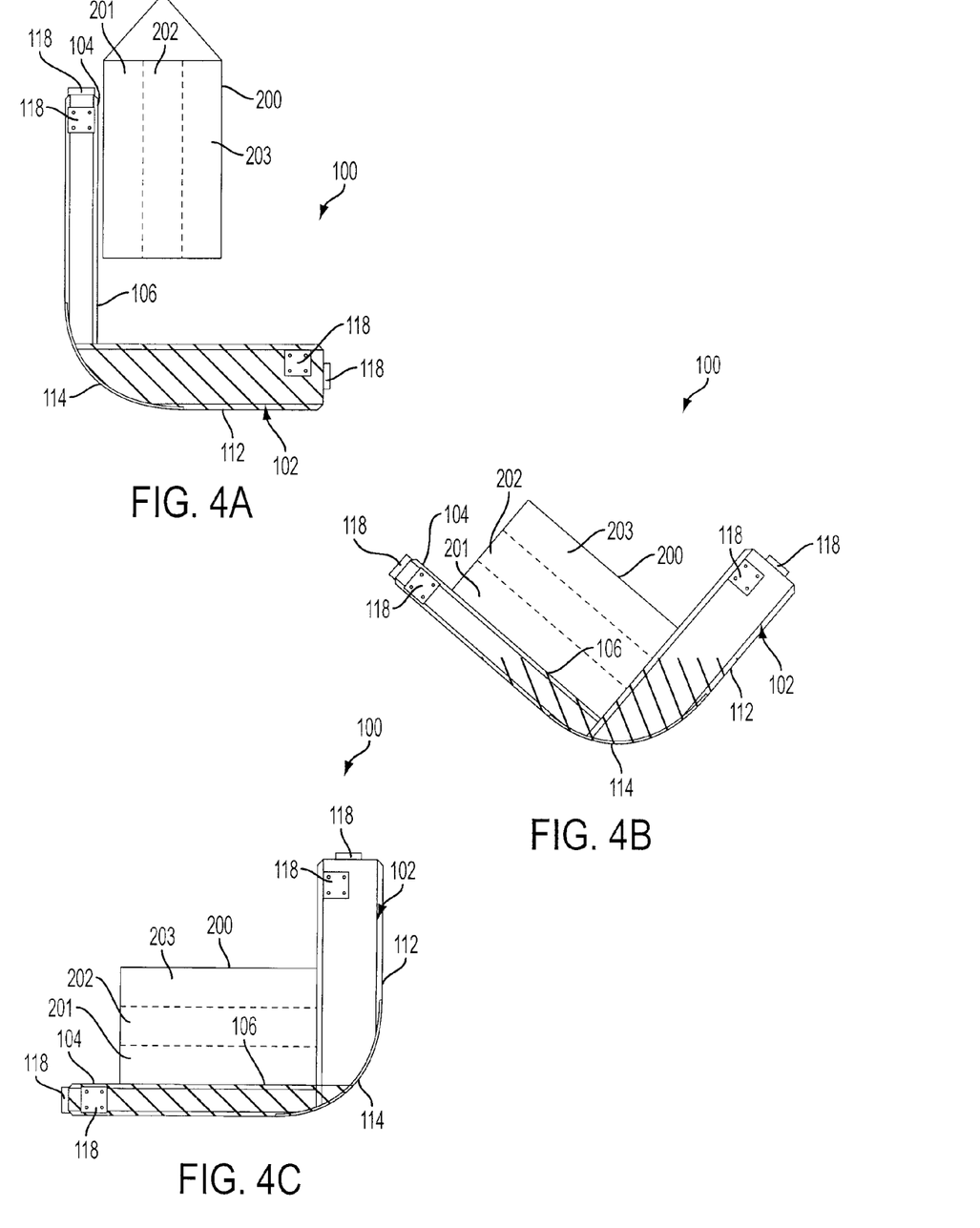
FIGS. 4A-E illustrate various positions of a mold rotator according to at least some aspects of this invention.

The rotation of the mold rotator 100 is described in further detail with reference to FIGS. 4A-C. As seen in FIG. 4A, the mold 200 may be lowered into the mold rotator 100 via a hoist, crane or other means. The mold may, or may not, be secured to the mold rotator by any of various means. In this first position the L-shaped mold rotator 100 is oriented so that the base 112 of the first section 102 of the L-shape of the mold rotator 100 is in contact with the ground while supporting a first side of the mold 200.

As seen in FIGS. 4B-C, the L-shaped rotator 100 rotates to a second position approximately 90° out of phase with the first position. In the second position, the L-shaped mold rotator 100 may hold the mold 200 so that the base 112 of the second section 104 of the L-shape of the mold rotator 100 is in contact with the ground while supporting a second side of the mold 200. Therefore, as can be seen in the FIGS. 4A-C, the mold rotator 100 can automatically rotate 90 degrees via the curved section 114 upon a mold 200 being lowered onto the mold rotator 100. The simplicity of the design and configuration of the above described L-shaped mold rotator 100 allows it to effectively rotate the mold 200 while being less complicated and less expensive than the mold rotators described in the background section.

It is noted that in some embodiments, the mold rotator 100, including its first and second sections 102 and 104, is sized so that when a mold 200 for which the mold rotator 100 has been sized, is placed in the mold rotator 100, the center of gravity of the combination of mold rotator 100 and mold 200 lies within the curved section 114 and, therefore, the mold rotator 100 rotates automatically from the first position to the second position. However, other aspects of the invention allow the mold rotator 100 to be altered to accommodate molds other than molds 200 for which the mold rotator 100 has been sized. The mold rotator 100 may include rotation aiding elements 118. Rotation aiding elements 118 are elements that will aid the rotation of the mold rotator when the dimensions of the mold 200 do not allow the center of gravity of the combination of the mold rotator 100 and mold 200 to fall within the curved section 114. For example, in one embodiment the rotation aiding elements 118 may be weights, such as weight plates, that can be attached at particular points of the mold rotator 100 to alter the center of gravity of the mold rotator 100 and, therefore, allow the mold rotator 100 to rotate automatically upon placement of a mold 200 into the mold rotator 100. For example, as shown in FIG. 1, the rotation aiding elements 118 may be positioned at the sides or ends of the mold rotator 100. Additionally, the rotation aiding elements 118 may be connection means for allowing the mold rotator 100 to be rotated by external forces. For example, the mold rotator 100 could include connections means for securing a hook from a crane or other device that will rotate the mold rotator 100 if the size of the mold 200 does not allow the mold rotator 100 to rotate automatically by itself. Again, as seen in FIG. 1, these rotation aiding elements 118 may be placed at the ends of the mold rotator 100 to allow the crane of other means to be connected and then rotate the mold rotator 100. Therefore, the rotation aiding elements 118 allow the mold rotator 100 to effectively and safely rotate molds 200 even if those molds' dimensions would put the center of gravity of the combination of the mold rotator 100 and the mold 200 outside the curved section 114 and thereby prevent the mold rotator 100 from rotating automatically upon placement of the mold 200 into the mold rotator 100.

While the rotation of the mold rotator has been described above, other aspects of the invention are directed to a stabilizing system for a mold rotator. The stabilizing system keeps the mold rotator stationary in particular position and thereby prevents inadvertent rotation of the mold rotator.

Consider, for example, the mold referenced in the background section which is comprised of several pieces, e.g. steel plate-like pieces. When the mold is in an operating position, the steel plate-like pieces may be vertically oriented. Attempting to disassemble the mold while the plates are vertically oriented would be difficult because the pieces are at higher potential energy and prone to tipping over once they are separated from the rest of the mold. Considering the size and weight of a mold, as described above, such disassembly of the mold may not only be difficult, but also dangerous, because the pieces of the mold themselves may be large and/or heavy. However, if the mold is rotated 90° so that the steel plates are horizontal, the disassembly of the mold would be easier and safer as the plates would be at a lower potential energy because they are flat.

Also as described above in the background section, other simple conventional mold rotators suffer from the drawback that that the mold cannot be easily and safely disassembled or removed from the rotator, because these simple mold rotators lack a stabilizing system to stabilize the mold rotator. Therefore, in conventional mold rotators, without a stabilizing system, if the mold is rotated from a first position to a second, rotated position in order for the mold to be disassembled, the mold rotator will self-rotate back to the first position once the weight of the partially disassembled mold is less than the weight of the other side of the rotator. For the reasons given above, this inadvertent rotation of the mold rotator and/or remaining mold pieces can be hazardous to the operator, mold rotator and the mold itself.

Therefore, mold rotators according to at least some examples of aspects of the invention may include a stabilizing system for stabilizing an L-shaped mold rotator wherein the stabilizing system stabilizes the L-shaped mold rotator and does not require external forces to stabilize it once it is rotated to a second rotated position. In such embodiments, the stabilizing system will keep the mold rotator stationary in particular position and thereby prevent inadvertent rotation of the mold rotator. For example, when the mold rotator is unloaded state, the stabilizing system will ensure that the mold rotator remains in that first, fixed position. When a mold is placed onto the mold rotator and the mold rotator rotates 90 degrees, the stabilizing system will ensure that the mold rotator remains stationary in a second fixed position 90 degrees out of phase from the first fixed position.

According to at least one embodiment of the invention, the L-shaped mold rotator 100 may include a stabilizing system 116 that changes the center of gravity of the mold rotator. For example, the stabilizing system 116 can redistribute weight between the sections of the L-shape to change the center of gravity of the L-shaped mold rotator. According to at least some aspects of the invention the weight of the mold rotator may be redistributed between the two sections 102, 104 of the L-shape of the rotator 100. For example, as described above, the mold rotator 100 can rotate via the curved section 114 when a mold 200 is placed in the mold rotator 100. Therefore, as a mold 200 is lowered onto the mold rotator 100, the mold rotator 100 will automatically rotate 90° and the weight of the mold 200 placed into the mold rotator 100 activates the stabilizing system 116. During rotation, the stabilizing system 116 redistributes the weight within the mold rotator 100 to one of the two sections 102, 104 of the L-shape. Therefore, the stabilizing system 116 would hold the mold rotator 100 stationary by keeping that section 102 or 104 fixed in that position. Further, the stabilizing system 116 keeps the mold rotator 100 fixed in that position even as the mold 200 is being disassembled. In other words, even though the weight of the mold 200 on the rotator 100 decreased or was removed entirely, the stabilizing system 116 would ensure the mold rotator 100 stays fixed in that position. Thereby, any inadvertent rotation of the mold rotator 100 is eliminated and hence, potential hazards for the mold, mold rotator or operator are also eliminated.

According to one embodiment of the invention, the stabilizing system 116 includes one or more conduits through which a material is transferred between the first section 102 and the second section 104. In this embodiment, once the material is positioned in either the first or second sections 102, 104 of the L-shape, the rotator 100 will remain in that position and be effectively prevented from inadvertently rotating back to other section of the L-shape. According to some aspects of the invention, the conduits may be the L-shaped legs 108, 110 and connecting portions therebetween which form a periphery of the mold rotator 100. In such embodiments, the L-shaped legs 108, 110 and connecting portions therebetween are tubular to allow the material to be transferred between (1) the first section portions 108a, 110a of the L-shaped legs 108, 110 and connecting portion therebetween and (2) the second section portions 108b, 110b of the L-shaped legs 108, 110 and connecting portion therebetween. Therefore, the material is effectively moved between the two sections 102, 104 of the L-shaped rotator 100. As discussed above the mold rotator 100 may have other embodiments, e.g. instead of a periphery of conduits surrounding the mold rotator 100, the mold rotator 100 may have a hollow center through which the material is moved or a combination of external and internal conduits, etc. Regardless of the particular positioning of the stabilizing system 116, as long as the same function of effectively transferring the material is realized, other variations of it may be employed.

According to aspects of the invention, the material may be transferred between the two sections 102, 104 of the L-shape of the rotator 100 by gravity. For example, as described above, the mold rotator 100 can rotate via the curved section 114 when a mold 200 is placed in the mold rotator 100. Therefore, as a mold 200 is lowered onto the mold rotator 100, the mold rotator 100 will automatically rotate 90°. In this embodiment, the weight of the mold 200 placed into the mold rotator 100 would move the material to one of the two sections 102, 104 of the L-shape under the force of gravity. For example, the material of the stabilizing system can be transferred from the first section 102 to the second section 104 under the force of gravity merely by rotating the mold rotator 100. Therefore, the system does not require additional means for effectively transferring the material. This adds to the simplicity and cost effectiveness of the system while still ensuring the mold rotator 100 is stabilized in either the first position or the second position.

In at least some examples of the invention, the stabilizing system 116 may use a fluid as the material transferred by the between the two sections 102, 104 of the L-shape of the rotator 100. As seen in FIG. 1, the mold rotator 100 may include ports 122 for inserting or removing fluid. During insertion of the fluid, the particular positioning of the ports 122 shown in FIG. 1 prevents overfilling of the fluid into the mold rotator. In other words, if the one port is being filled and the other port is left open, the overfilling of the mold rotator can be prevented, because the fluid will escape through the port not being filled before the mold rotator is overfilled. Once the fluid has been inserted into the system, the fluid can flow though one or more conduits, such as the L-shaped legs 108, 110 within the mold rotator 100 to stabilize the mold rotator 100 to prevent inadvertent rotation. As discussed above, the L-shaped legs 108, 110, may be sealed, and therefore will be watertight to contain the fluid without leaking. Therefore, during rotation, the stabilizing system 116 redistributes the weight within the mold rotator 100 by transferring the fluid between one section of the L-shaped legs 108a, 110a and connecting portion therebetween to the other section of the L-shaped legs 108b, 110b and connecting portion therebetween. The amount of fluid in the system should be adequate to change the center of gravity of the rotator 100 to ensure that the rotator 100 will remain in either its first or second position once it has been rotated. In some examples, the sections of the L-shaped legs which contain the fluid (e.g. either 108a, 110a or 108b, 110b) may be filled, or almost filled, to ensure the rotator 100 remains in either the first or second, rotated position. In this way, the stabilizing system 116 would hold the mold rotator 100 stationary by keeping that section 102 or 104 fixed in that position.

An advantage of using fluid is that it provides an inexpensive and effective stabilizing system. For example, water can be used as the material of the stabilizing system. However, other types of liquid may be used as the material of the stabilizing system, for example, a heavier fluid. Another advantage of the fluid is that it is easily moved by gravity. As discussed above, using gravity to transfer the fluid is an efficient and inexpensive method of transferring material compared with other conventional mold rotators such as hydraulic/or motorized systems described in the background section.

While fluid is one material that may be used with the stabilizing system 116, solid materials may be used as well. For example, pellets, steel shot, etc. are examples of solids that may be used in the stabilizing system. These solids will flow like a fluid and also be moved by gravity in the same manner as a fluid. Therefore, such solids will be effective alternatives to the fluid. However, other solids can be used as well. For example, another example of a solid used with the stabilizing system 116 is slide weights. In this embodiment, the slide weights, such as lead weights, would slide from one end of the conduit to the other end in order to redistribute the weight and thereby alter the center of gravity. In these embodiments, the slide weights could slide along via rods which extend from one end of the mold rotator to the other.

The stabilizing system 116 may include additional means for controlling the transfer of material. For example, in some embodiments of the invention, the rotator may have means for preventing or aiding the material transfer between the two sections 102, 104. For example, the rotator 100 may include one or more valves, pumps, baffles, restriction orifices etc. for limiting, increasing or otherwise controlling the flow of the material between the sections 102, 104. For example, as seen in the illustrative embodiment of FIG. 1, the mold rotator includes restriction orifices 120. These restriction orifices will control the flow of the material between the sections 102, 104. Further, a control system may be incorporated into mold rotator 100 to control such transferring devices. While these embodiments use additional devices for transferring the material from one section to the other, it is noted that this may add to the complexity of the device.

Further understanding of the above described stabilizing system 116 may be had with reference to an example of such a stabilizing system which is shown in FIGS. 4A-E. First, as can be seen in FIG. 4A, the mold 200 is comprised of a series of plate-like sections 201-203. These movable sections 201-203 are engaged to form the mold 200. As can be seen in FIG. 4A, the movable sections of the mold are in a vertical orientation. As described previously, the disassembly of the sections in this orientation is difficult and potentially hazardous. Therefore, it is preferable to rotate the mold 90° to a horizontal orientation for removal or disassembly. Further, it is desirable to ensure that the mold rotator will not inadvertently rotate during removal or disassembly. Therefore, as seen in FIG. 4A, the stabilizing system of the L-shaped mold rotator 100 holds the rotator 100 stationary in a first position wherein the first section 102 is positioned to support a mold 200 which is lowered into the platform 106 of the mold rotator. The cross hatched portion of the mold rotator 100 indicates that weight is distributed in that first section 102. This ensures that the mold rotator is fixed in that first position while the mold rotator is in an unloaded state.

As discussed above, the size and proportions of the article rotator 100, including the first and second sections 102, 104, allow the center of gravity of the combined weight of the mold 200 and the mold rotator 100 to lie within the curve of the curved section 114. Therefore, the mold rotator 100 allows a mold 200 to be safely rotated simply by lowering the mold 200 onto the mold rotator 100. In other words, as shown in FIGS. 4B-C, when a mold 200 is lowered onto the mold rotator 100, the mold rotator 100 automatically rotates along the curved section of its base approximately 90° from a first position to a second, rotated position. During rotation, the stabilizing system 116 redistributes the weight (e.g. transfers the material of the stabilizing system) within the mold rotator 100 from the first section 102 to the second section 104, indicated by the cross hatching. Therefore, the stabilizing system has changed the center of gravity of the mold rotator.

As shown in FIG. 4C, the L-shaped mold rotator 100 has rotated approximately 90° to a second position wherein the second section 104 is positioned to support the mold 200. As can be seen the center of gravity of mold rotator has been changed. The cross hatched portion indicates that weight is distributed in that second section 104 to fix the mold rotator 100 in that second position. Further, as can be seen, the movable sections 201-203 are now oriented horizontally. As discussed above, this new orientation will allow the mold to be disassembled or removed in a safer manner because the sections 201-203 are at a lower potential energy.

Figure 4D:
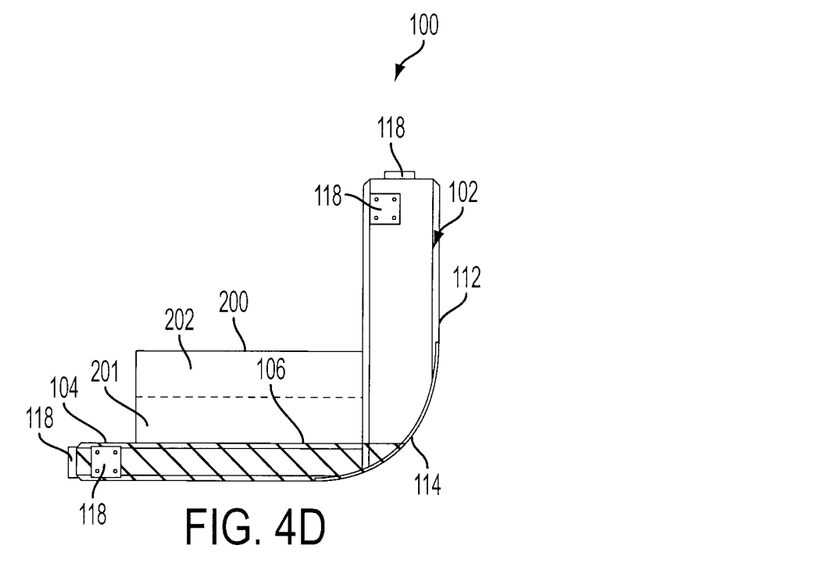

As shown in FIG. 4D, the mold 200 has been partially disassembled. In contrast to other conventional mold rotators, the mold rotator 100 remains fixed in the second position despite the removable of movable section 203. As shown by the cross hatching the redistributed weight (e.g. the transferred material) is keeping the rotator stationary whereas other conventional mold rotators would have self rotated back to the first position causing potential harm to the mold, the mold rotator and the operator.

Figure 4E:
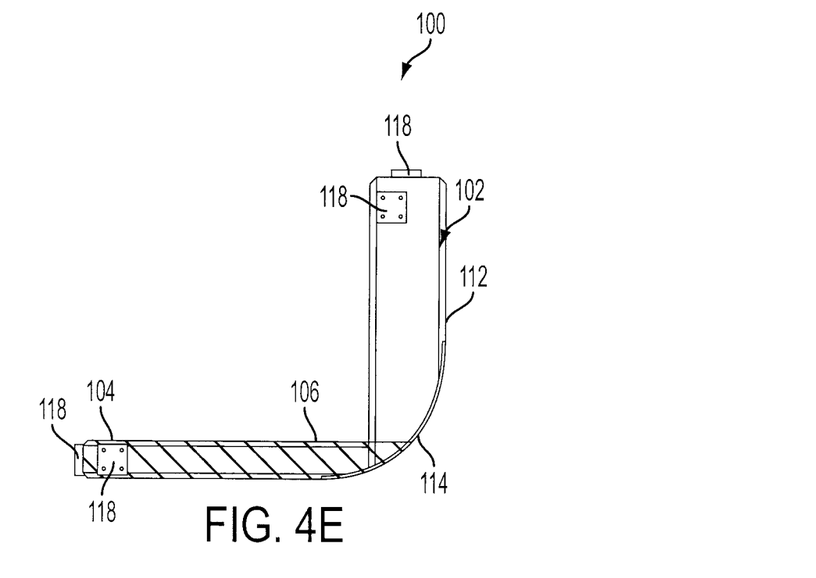

Further, FIG. 4E demonstrates the mold rotator 100 remaining the second position once the mold 200 has been completely removed from the mold rotator 100. As discussed above, the center of gravity of the mold rotator has changed so that even when the mold 200 is removed from the mold rotator 100, the mold rotator 100 will remain in the second rotated position and not self-rotate back to the first position. Therefore, as shown, the redistributed weight of the mold rotator 100 will prevent rotation of the mold rotator 100 regardless of how much weight has been removed once the mold rotator 100 has been rotated to the second position. Hence, the stabilizing system 116 which redistributes the weight to change the center of gravity of the mold rotator 100 provides a safe and effective means for stabilizing the mold rotator 100 in either of the first or second positions.

At least some other aspects of this invention relate to methods for rotating a mold. The methods may include: inserting a mold in a mold rotator; rotating the mold; and stabilizing the mold. More specific aspects of the methods may relate to rotating the mold along a curved section of the base of a mold rotator and stabilizing the mold in a stationary position to prevent inadvertent rotation of the mold. The mold rotator used in particular aspects of some of the example methods of this invention may take on various constructions and have various features, including, for example, an L-shaped platform, a curved based and a stabilizing system.

CONCLUSION

Various examples of the present invention have been described above, and it will be understood by those of ordinary skill that the present invention includes within its scope all combinations and subcombinations of these examples. Additionally, those skilled in the art will recognize that the above examples simply exemplify the invention. Various changes and modifications may be made without departing from the spirit and scope of the invention, as defined in the appended claims.

The invention claimed is:

1. A method for rotating a mold comprising:
    placing the mold in an L-shaped mold rotator having a first section and a second section approximately perpendicular to the first section;
    rotating the L-shaped mold rotator, along a curved section that joins the first section and the second section of the L-shaped mold rotator, from a first position to a second position; and changing a center of gravity of the L-shaped mold rotator by transferring a fluid, within at least a conduit and during the rotating, between the first section of the L-shaped mold rotator and the second section of the L-shaped mold rotator, wherein a resulting changed center of gravity stabilizes the L-shaped mold rotator in the second position.

2. The method for rotating a mold according to claim 1, wherein the fluid is transferred between the first section and the second section by gravity.

3. The method for rotating a mold according to claim 2, wherein the L-shaped mold rotator rotates automatically, upon insertion of the mold into the L-shaped mold rotator, between a first position and a second position, wherein the second position is 90 degrees out of a phase relative to the first position.

4. The method of claim 1, wherein the mold comprises multiple elements, and further comprising:
after the rotating of the L-shaped mold rotator, disassembling the mold by removing one or more of the elements, wherein removal of the one or more elements does not result in a change of the center of gravity of the L-shaped mold rotator tending to rotate the L-shaped mold rotator.

5. The method of claim 1, wherein the placing the mold in an L-shaped mold rotator comprises placing the mold in an L-shaped mold rotator comprising the first section comprising a first flat face and the second section comprising a second flat face, wherein the first section and the second section form the L-shaped mold rotator, and wherein the base includes the first flat face and the second flat face connected by a curved bottom edge.

6. The method of claim 5, wherein the first section and the second section are integrally formed.

7. The method of claim 5, wherein the L-shaped mold rotator comprises at least two L-shaped legs which extend substantially through the L-shaped platform including between the first section and the second section, each of the at least two L-shaped legs is hollow and sealed, and the transferring of the fluid comprises transferring the fluid in a conduit that includes the at least two L-shaped legs.

8. A method for rotating a article comprising:
placing the article in an L-shaped mold rotator having a first section and a second section approximately perpendicular to the first section;
rotating the L-shaped mold rotator, along a curved section that joins the first section and the second section of the L-shaped mold rotator, from a first position to a second position; and
changing a center of gravity of the L-shaped mold rotator by transferring a material, within at least a conduit and during the rotating, between a first internal section of the L-shaped mold rotator and a second internal section of the L-shaped mold rotator, wherein a resulting changed center of gravity stabilizes the L-shaped mold rotator in the second position.

9. The method of claim 8, wherein the transferred material is a fluid.

10. The method of claim 8, wherein the transferred material is a solid.

11. The method of claim 10, wherein the transferred material comprises at least one of pellets, steel shot or other material movable by gravity in the same manner as a fluid.

12. The method of claim 10, wherein the placing the article in the L-shaped mold rotator comprises placing a mold in the L-shaped mold rotator.

13. The method of claim 8, wherein the placing the article in the L-shaped mold rotator comprises placing a mold in the L-shaped mold rotator.

14. The method of claim 13, wherein the mold comprises multiple elements, and further comprising:
after the rotating of the L-shaped mold rotator, disassembling the mold by removing one or more of the elements, wherein removal of the one or more elements does not result in a change of the center of gravity of the L-shaped mold rotator tending to rotate the L-shaped mold rotator.

15. A method for rotating an article comprising:
placing the article in a rotator, wherein
the rotator comprises a first section comprising a first flat face and a second section comprising a second flat face,
the first section and the second section are positioned substantially perpendicularly to each other to produce a base and an L-shaped platform configured to receive the article,
the base includes the first flat face, the second flat face, and a curved section, wherein the first flat face and the second flat face are perpendicular to each other, and wherein the curved section is at the intersection of the first section and the second section and joins the first flat face to the second flat face and exhibits a concave towards the L-shaped platform, and
the rotator comprises a stabilizing system including at least a conduit configured to move a material between the first section and the second section, and the stabilizing system is configured to stabilize the rotator in a first position wherein the rotator is supported on the first flat face and in a second position wherein the rotator is supported on the second flat face by transferring the material within the rotator between the first and second sections; and
rotating the rotator and the placed article along the curved section from the first position to the second position, wherein a center of gravity of the rotator changes during the rotation as a result of transferring the material between the first and second sections and stabilizes the rotator in the second position.

16. The method of claim 15, wherein the material is a fluid.

17. The method of claim 15, wherein the material is a solid.

18. The method of claim 17, wherein the material comprises at least one of pellets, steel shot or other material movable by gravity in the same manner as a fluid.

19. The method of claim 15, wherein placing the article in the rotator comprises placing a mold in the rotator.

20. The method of claim 19, the mold comprises multiple elements, and further comprising:
after the rotating of the rotator, disassembling the mold by removing one or more of the elements, wherein removal of the one or more elements does not result in a change of a center of gravity of the rotator tending to rotate the rotator.

21. The method of claim 1, wherein stabilizing the L-shaped mold rotator comprises changing a center of gravity of the L-shaped mold rotator by transferring a fluid from a location within the first section of the L-shaped mold rotator to a location within the second section of the L-shaped mold rotator.

22. The method of claim 8, wherein the transferred material is separate from the article, and wherein transferring the material comprises transferring the material from a location within the first internal section to a location within the second internal section.

23. The method of claim 15, wherein the transferred material is separate from the article, and wherein transferring the material comprises transferring the material from a location within the first section to a location within the second section.

* * * * *